(12) United States Patent
Yamato et al.

(10) Patent No.: US 6,397,611 B1
(45) Date of Patent: Jun. 4, 2002

(54) AIR CONDITIONER AND BRUSHLESS MOTOR CONTROL UNIT

(75) Inventors: Ikuo Yamato, Hitachi; Yasuo Notohara, Hitachiohta; Akihiro Tanba; Tadashi Fukushima, both of Hitachi, all of (JP)

(73) Assignee: Hitachi, Ltd., Tokoyo (JP)

( * ) Notice: Subject to any disclaimer, the term of this patent is extended or adjusted under 35 U.S.C. 154(b) by 0 days.

(21) Appl. No.: 09/585,398

(22) Filed: Jun. 2, 2000

(30) Foreign Application Priority Data

Jun. 4, 1999 (JP) .......................................... 11-157481

(51) Int. Cl.[7] .............................................. F25D 17/00
(52) U.S. Cl. .......................................... 62/180; 62/298
(58) Field of Search ..................... 62/180, 298, 324.6, 62/228.4; 318/254, 723, 801, 46

(56) References Cited

U.S. PATENT DOCUMENTS

| | | | |
|---|---|---|---|
| 4,879,502 A | * | 11/1989 | Endo et al. ................. 318/723 |
| 5,299,432 A | * | 4/1994 | Nakae et al. ................. 62/298 |
| 5,339,013 A | * | 8/1994 | Nakai et al. ................. 318/254 |
| 5,436,547 A | * | 7/1995 | Nagai et al. ................. 318/801 |
| 5,634,352 A | * | 6/1997 | Nagai et al. ............... 62/324.6 |
| 5,694,010 A | * | 12/1997 | Oomura et al. ............. 318/254 |
| 5,712,540 A | * | 1/1998 | Toda et al. ..................... 318/46 |
| 5,857,349 A | * | 1/1999 | Hamaoka et al. .......... 62/228.4 |
| 6,060,859 A | | 5/2000 | Jonokuchi |
| 6,211,635 B1 | * | 4/2001 | Kambe et al. ............... 318/254 |

* cited by examiner

*Primary Examiner*—Teresa Walberg
*Assistant Examiner*—Leonid Fastovsky
(74) *Attorney, Agent, or Firm*—Antonelli, Terry, Stout & Kraus, LLP

(57) ABSTRACT

A circuit for controlling the outdoor unit of an air conditioner comprises a microcomputer which controls two brushless motors and a microcomputer which controls the whole outdoor unit. In accordance with the present invention, separation of a function for controlling the brushless motors from a function for controlling the whole outdoor unit can simplify software for said microcomputers.

7 Claims, 11 Drawing Sheets

FIG. 4
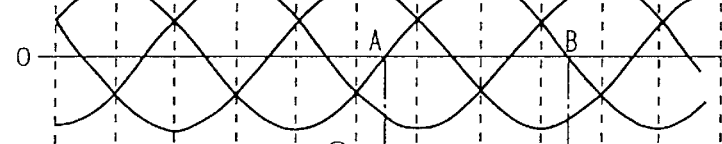
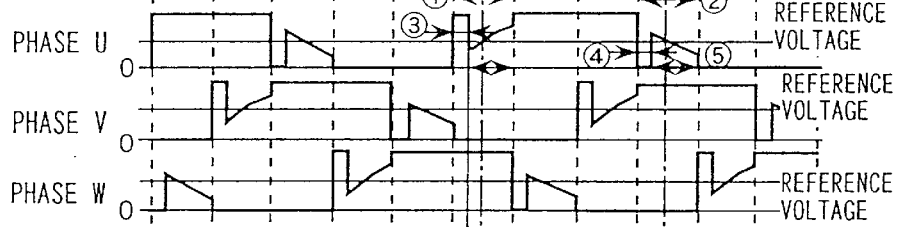
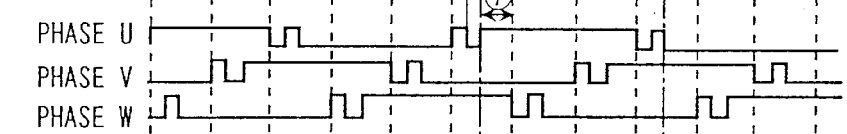
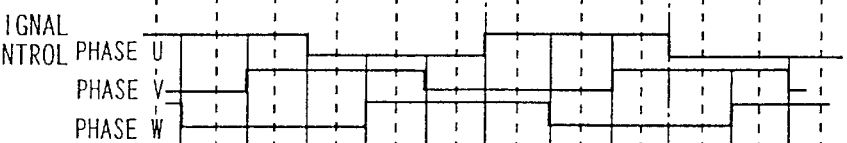
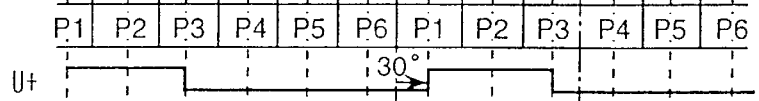
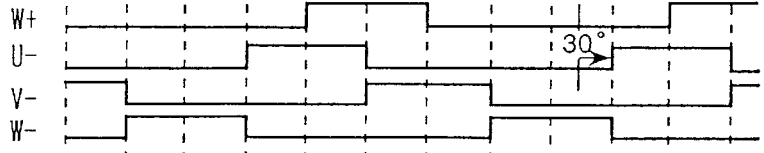
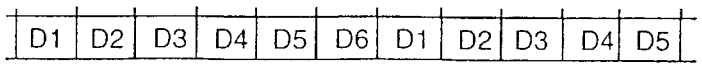

FIG. 7(a)
POSITION SIGNAL PATTERN TABLE

| POINTER | | | |
|---|---|---|---|
| 1 | 1 | P1 | P1' |
| ⋮ | | ⋮ | ⋮ |
| 1 | 6 | P1 | P6' |
| 2 | 1 | P2 | P1' |
| ⋮ | | ⋮ | ⋮ |
| 2 | 6 | P2 | P6' |
| ⋮ | | ⋮ | ⋮ |
| 6 | 6 | P6 | P6' |

FIG. 7(b)
CONTINUITY SIGNAL PATTERN TABLE

| POINTER | | | |
|---|---|---|---|
| 1 | 1 | D1 | D1' |
| ⋮ | | ⋮ | ⋮ |
| 1 | 6 | D1 | D6' |
| 2 | 1 | D2 | D1' |
| ⋮ | | ⋮ | ⋮ |
| 2 | 6 | D2 | D6' |
| ⋮ | | ⋮ | ⋮ |
| 6 | 6 | D6 | D6' |

FIG. 7(c) PRESENT POSITION POINTER

FIG. 7(d) NEXT POSITION POINTER 1

FIG. 7(e) NEXT POSITION POINTER 2

FIG. 7(f) NEXT POSITION POINTER 3

| | |
|---|---|
| PRESENT POSITION SIGNAL PATTERN NUMBER (FOR THE COMPRESSOR) | PRESENT POSITION SIGNAL PATTERN NUMBER (FOR THE FAN UNIT) |
| PRESENT POSITION SIGNAL PATTERN NUMBER (FOR THE COMPRESSOR) +1 | PRESENT POSITION SIGNAL PATTERN NUMBER (FOR THE FAN UNIT) +1 |
| PRESENT POSITION SIGNAL PATTERN NUMBER (FOR THE COMPRESSOR) | PRESENT POSITION SIGNLA PATTERN NUMBER (FOR THE FUN UNIT) |
| PRESENT POSITION SIGNAL PATTERN NUMBER (FOR THE COMPRESSOR) +1 | PRESENT POSITION SIGNAL PATTERN NUMBER (FOR THE FAN UNIT) +1 |

AIR CONDITIONER AND BRUSHLESS MOTOR CONTROL UNIT

BACKGROUND OF THE INVENTION

The present invention relates to a unit for controlling a brushless motor and an air conditioner which is driven by a brushless motor.

Recently, energy-saving has been strongly urged to prevent global warming. This is particularly applicable to air conditioners. For this purpose, and to provide high-efficiency operations in recent air conditioners have employed a method of using brushless motors to run a compressor and a fan in the outdoor unit of each air conditioning system. This conventional method of using brushless motors has been disclosed in Japanese Patent laid-open Publication No. 8-35713 (1996), and an example of this conventional approach is illustrated in FIG. 11.

Referring to FIG. 11, microcomputer 8 receives signals from a position detecting circuit 9 of a brushless motor 5 for a compressor and a position detecting circuit 10 of a brushless motor 7 for a fan, estimates the pole position of the rotor of each brushless motor, generates signals to drive switching elements of inverters 4 and 6, causes the switching elements to turn on, according to the pole positions of each brushless motor, and thus drives the respective brushless motors at various speeds. The microcomputer also controls a d.c. voltage to a preset value which is determined by the load and revolutions per minute of the compressor motor and generates a signal to drive a switching element 31 of a boosting chopper 3 to shape the waveform of a current fed to a rectifying circuit 2 (to form sine waves), to eliminate higher harmonic components in the input current, and to improve the power factors.

The above processing enables the brushless motor for the compressor and the brushless motor for the fan to be run at various speeds by the inverters. This can make the air conditioner more efficient.

The above-referenced publication has disclosed that the microcomputer 8 has a function of controlling the brushless motor 5 for the compressor, the brushless motor 7 for the fan, and the boosting chopper 3. However, no reference has been made therein to the fact that the microcomputer has to control the whole outdoor unit of the air conditioner. In other words, the microcomputer 8 is required to control all elements of the outdoor unit, including coolant valves, relays, etc. in addition to control for the two inverters 4 and 6 and the brushless motors 5 and 7. Therefore, the microcomputer 8 must perform various operations in a time sharing manner according to the control cycles of the respective units. This makes the software of the microcomputer 8 very complicated. Further, the software for the microcomputer 8 must be changed greatly if steps are taken to improve the cooling cycle or to change the sequences of the air conditioner, which increases the steps for functional changes.

SUMMARY OF THE INVENTION

With the above problems in mind, the air conditioner in accordance with the present invention contains a microcomputer for controlling two brushless motors in the outdoor unit and a microcomputer for controlling the whole outdoor unit. This can separate control of the brushless motors and inverters from control of the whole outdoor unit and prevent the software for each microcomputer from being complicated. The cooling cycles and sequences can be changed merely by changing the content of software for the microcomputer to control the whole outdoor unit.

Further, the microcomputer to control brushless motors in accordance with the present invention is designed to collectively fetch position detecting signals from the two brushless motors and estimate the positions of their rotor poles, which suppresses the increase of the load of the microcomputer which controls the brushless motors.

BRIEF DESCRIPTION OF THE DRAWINGS

FIG. 4 is a time chart illustrating detection of pole positions of a rotor of a brushless motor and generation of an Inverter Continuity (ON) signal.

FIGS. 7(a) to 7(f) are diagrams which show a position signal pattern table, an Inverter (ON) signal pattern table, and various pointer configurations, respectively.

DESCRIPTION OF PREFERRED EMBODIMENTS

Figure 1:
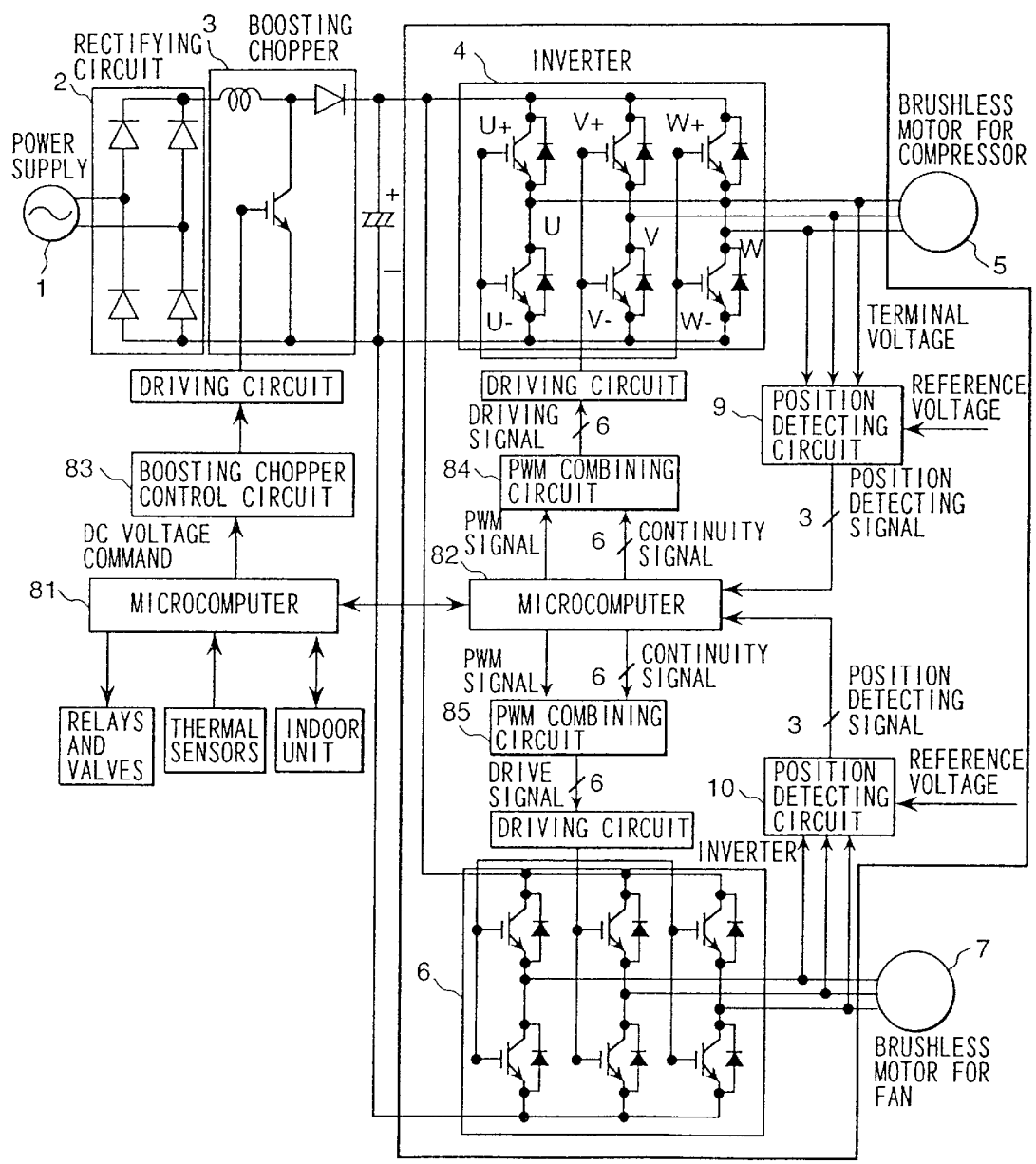
FIG. 1 is a schematic circuit diagram of an outdoor unit of an air conditioner in accordance with the present invention.

Referring to FIG. 1, which is a schematic circuit diagram of an outdoor unit of an air conditioner in accordance with the present invention, the microcomputer 81 generates Valve Open/Close commands for controlling coolant valves, DC Voltage commands for the boosting chopper, Compressor number of revolutions (RPM) commands, and Fan number of revolutions (RPM) commands, on the basis of RUN commands from the indoor unit and the outdoor temperature. The RPM commands for the compressor brushless motor 5 and RPM commands for the fan brushless motor 7 are transferred from the microcomputer 81 to the microcomputer 82. On the other hand, the running states of the brushless motors 5 and 7 are transferred from the microcomputer 82 to the microcomputer 81.

Figure 2:
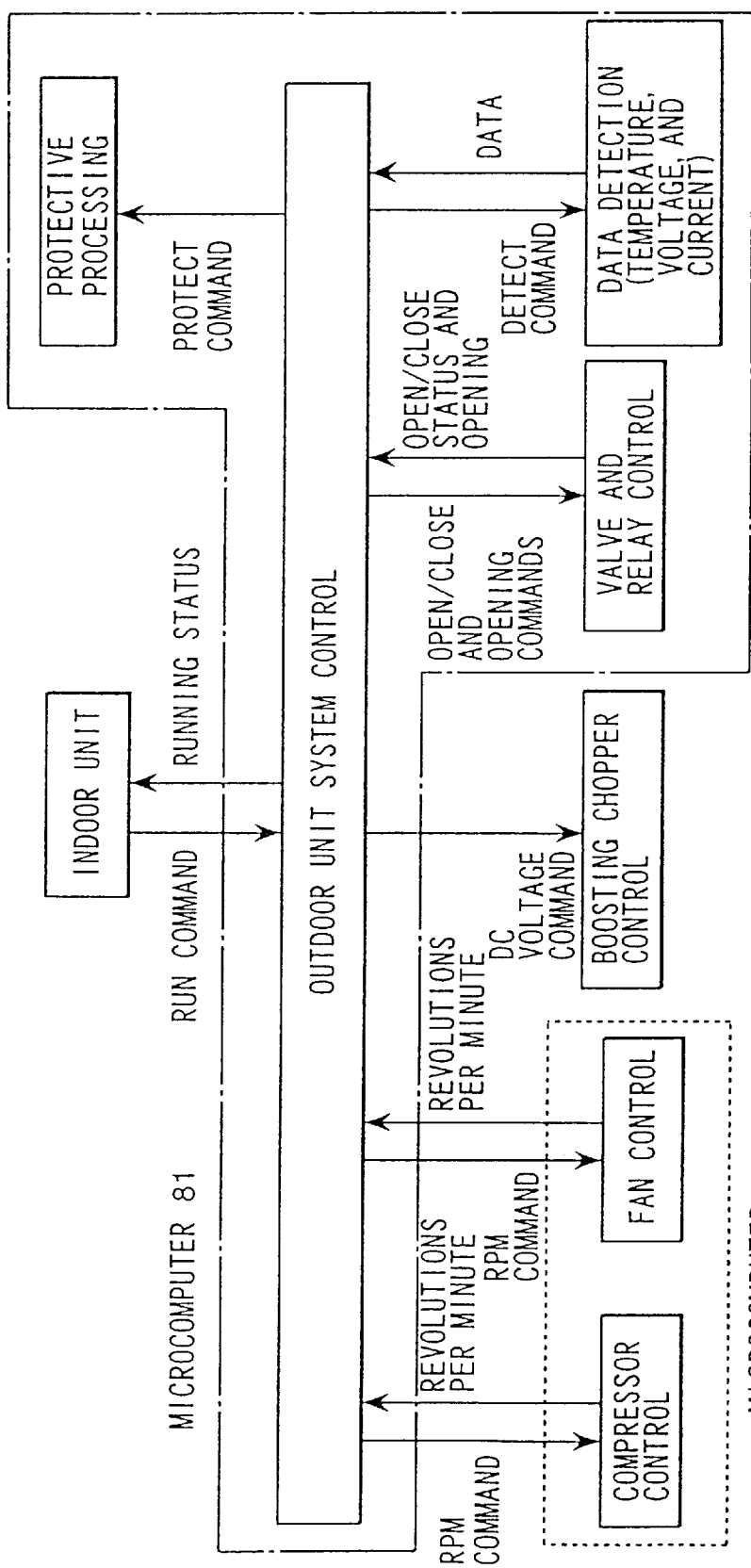
FIG. 2 is a functional block diagram of an outdoor unit of an air conditioner in accordance with the present invention.

The functional roles of the microcomputers 81 and 82 are illustrated in FIG. 2. The microcomputer 81 receives RUN commands from the indoor unit and sends them to the components of the outdoor unit in a preset sequence. Further, the microcomputer 81 collects the operating status of respective components and sensor information and sends them to the indoor unit. When detecting a faulty component in the outdoor unit, the microcomputer 81 orders respective components to take on a protective operation in a preset sequence.

Figure 3:
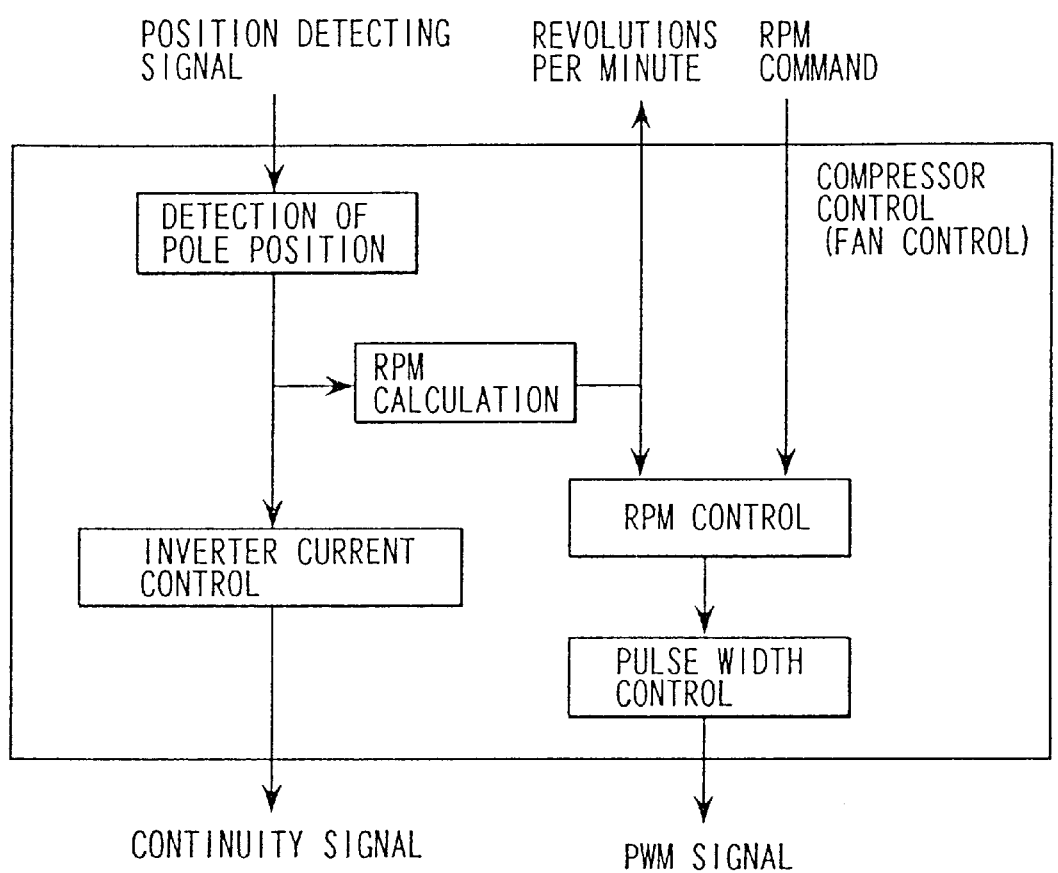
FIG. 3 is a functional block diagram of a brushless motor control circuit in accordance with the present invention.

The microcomputer 82 receives RPM signals for the compressor and the fan, and controls the inverters 4 and 6 according to the RPM signals to run the compressor brushless motor 5 and the fan brushless motor 7 respectively at a variable speed. FIG. 3 shows the outline of the brushless motor control, which is applicable to both the compressor and fan brushless motors. The microcomputer 82 estimates the positions of rotor poles of brushless motors 5 and 7 from the position detecting signals which are the outputs of the position detecting circuits 9 and 10 (see FIG. 1) and generates Inverter Continuity (ON) signals according to the estimated pole positions. Further, the microcomputer 82 calculates the number of revolutions (RPM) of each brushless motor from the cycle of respective pole position signals and PWM controls the output voltage so that the actual RPM of the brushless motor may be equal to the commanded RPM.

An explanation will be given as to how the microcomputer 82 estimates the pole position of the rotor of a respective brushless motor. FIG. 4 shows waveforms which are used to explain a method of estimating pole positions and effect generation of Inverter Continuity (ON) signals.

A brushless motor induces voltages of three phases on the windings of the stator as the rotor revolves as shown in FIG. 4, line (2). These induced voltages have information about positions of the rotor poles.

The switching elements are to be turned on in each inverter as shown in FIG. 4, line (1). For example, the inverter 4 for the compressor brushless motor has three phase outputs U, V, and W. The switching elements for positive DC voltages of the phases are respectively represented by U+, V+, and W+. Similarly, the switching elements for negative DC voltages are respectively represented by U−, V−, and W−. Therefore, the switching patterns of the switching elements of the inverter must be changed at every electrical angle of 60 degrees. There are six Inverter Continuity (ON) patterns (which are obtained by dividing 360 degrees by 60 degrees). In FIG. 4, line (7), the ON (continuity) status of each switching element is represented by a High level and the OFF (non-continuity) status of each switching element is represented by a Low level. Each of the Inverter Continuity (ON) patterns D1 through D6 in FIG. 4, line (8) consists of a combination of these high and low levels. Inverter Continuity (ON) patterns are switched each time the induced voltages of any two phases cross with each other as shown in FIG. 4, lines (1) and (2). However, it is impossible to directly detect these induced voltages (shown in FIG. 4, line (2)). Therefore, a conventional method to estimate the intersection of induced voltages uses the voltages on terminals of the brushless motor, as will be explained below.

An induced voltage of the brushless motor appears on the terminals of the motor during two OFF 60-degree periods in one cycle excluding a diode-ON period, as shown in FIG. 4, line (3). For example, an induced voltage of phase U appears on the terminals during periods ① and ⑥ in one cycle excluding diode-ON period ③ and ④. In periods ① and ②, the switching elements U+ and U− are both OFF. The pole position detecting circuit compares the voltage on the motor terminals by a reference voltage (e.g. the middle value of the DC voltage or neutral potential of the inverter output) and generates a position detecting signal (see FIG. 4, line (4)). This signal contains information about time points A and B at which the polarity of the induced voltage inverts. The microcomputer 82 fetches a position detecting signal and judges time points A and B. For judgment of a time point A, periods ② and ⑦ must be distinguished from each other as the position detection signal pattern of the diode-ON period ③ is equal to that of the period ⑦ at which the polarity of the induced voltage is inverted. When the voltage output from the inverter is PWM-controlled to adjust the RPM of the brushless motor, the waveform of the voltage on the terminals of the motor changes, which affects the position detection signal. Therefore, the influence by the PWM signal must be eliminated when the position detection signal is generated. Some methods have been disclosed for that purpose and will not be explained here. Position signals equivalent to the polarities of the induced voltages (see FIG. 4, line (5)) are created from position detection signals by one of such disclosed methods. FIG. 4, line (6), shows six patterns P1 through P6 which represent the combinations of position signals of three phases.

The microcomputer 82 changes the Inverter Continuity (ON) signal, judging a time point which has elapsed by an electric angle of 30 degrees after a time point at which the polarity of the Induced voltage changes or the position signal pattern changes as a time point at which the ON phase of the inverter must be changed.

Inverter Continuity (ON) signal patterns D1 through D6 in FIG. 4, line (8), are one-to-one related to position signal patterns P1 through P6.

Figure 5:
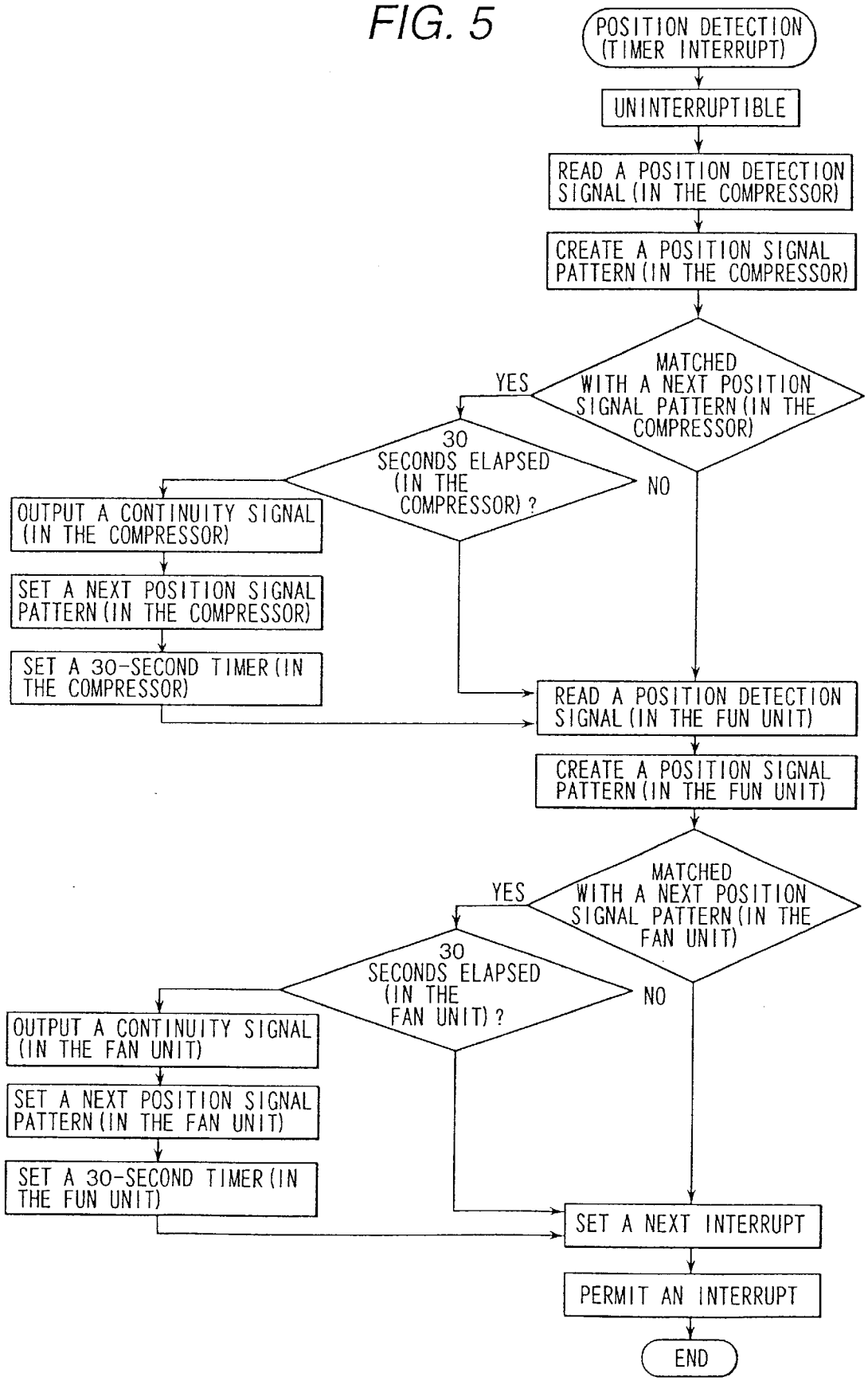
FIG. 5 is a flow chart of the process for detecting pole positions in accordance with the present invention.

FIG. 5 shows a flow chart for detection of pole positions of the brushless motors 5 and 7 and generation of Inverter ON signals by the microcomputer 82 of the embodiment in accordance with the present invention. As a high-precision position detection means is required to run a brushless motor at high efficiency, an interrupt request is made for the microcomputer periodically at a preset time interval to fetch a position detection signal from the brushless motor for the compressor. The microcomputer creates a position signal from the fetched position detection signal without a diode-ON period and an influence by PWM, and judges a current position signal pattern. When the position signal pattern is equal to the position pattern which comes next, the microcomputer checks to determine whether a time period equivalent to 30 degrees has passed from that time point. When the time passes, the microcomputer outputs an Inverter ON signal corresponding to the position signal pattern. Then, the microcomputer sets a next position signal pattern and a 30-degree timer. The above processing of the microcomputer is also applied to the brushless motor for the fan.

The embodiment in accordance with the present invention separates the function to control the brushless motors and the inverters from that to control the whole outdoor unit. This can prevent software for the microcomputers 81 and 82 from being complicated. Further, the control and sequence of the cooling cycle of the outdoor unit of the air conditioner can be accomplished just by changing software for the microcomputer 81. Consequently, this can greatly reduce the steps required to change functions of the air conditioner.

Figure 11:
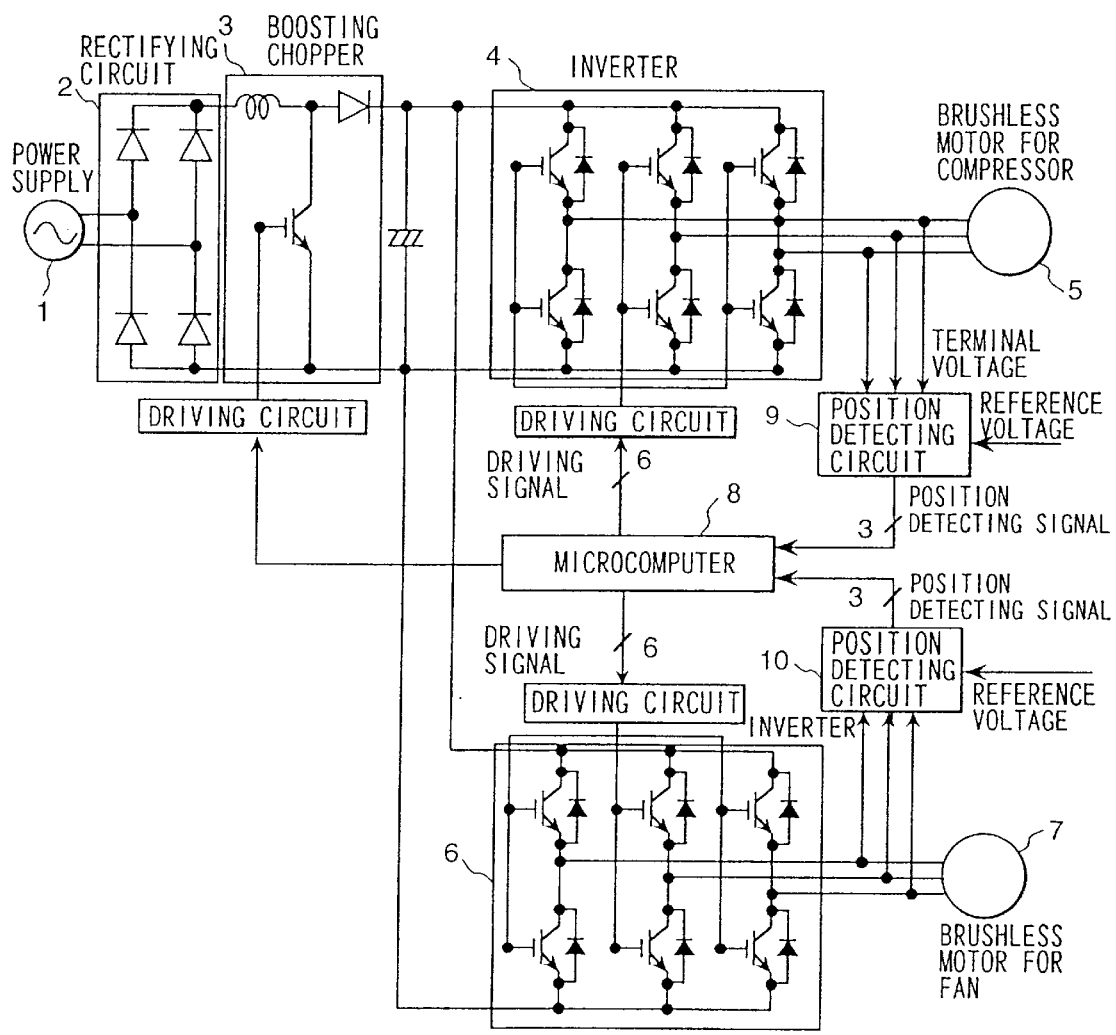
FIG. 11 is a circuit diagram of an outdoor unit of a conventional air conditioner.

In comparison by a conventional air conditioner shown in FIG. 11, the embodiment in accordance with the present invention shown in FIG. 1 combines PWM signals for the boosting chopper control circuit and for the inverters 4 and 6 outside the microcomputer. This has an effect to reduce the loads on the microcomputers 81 and 82, but this can also be performed in the microcomputers.

Figure 6:
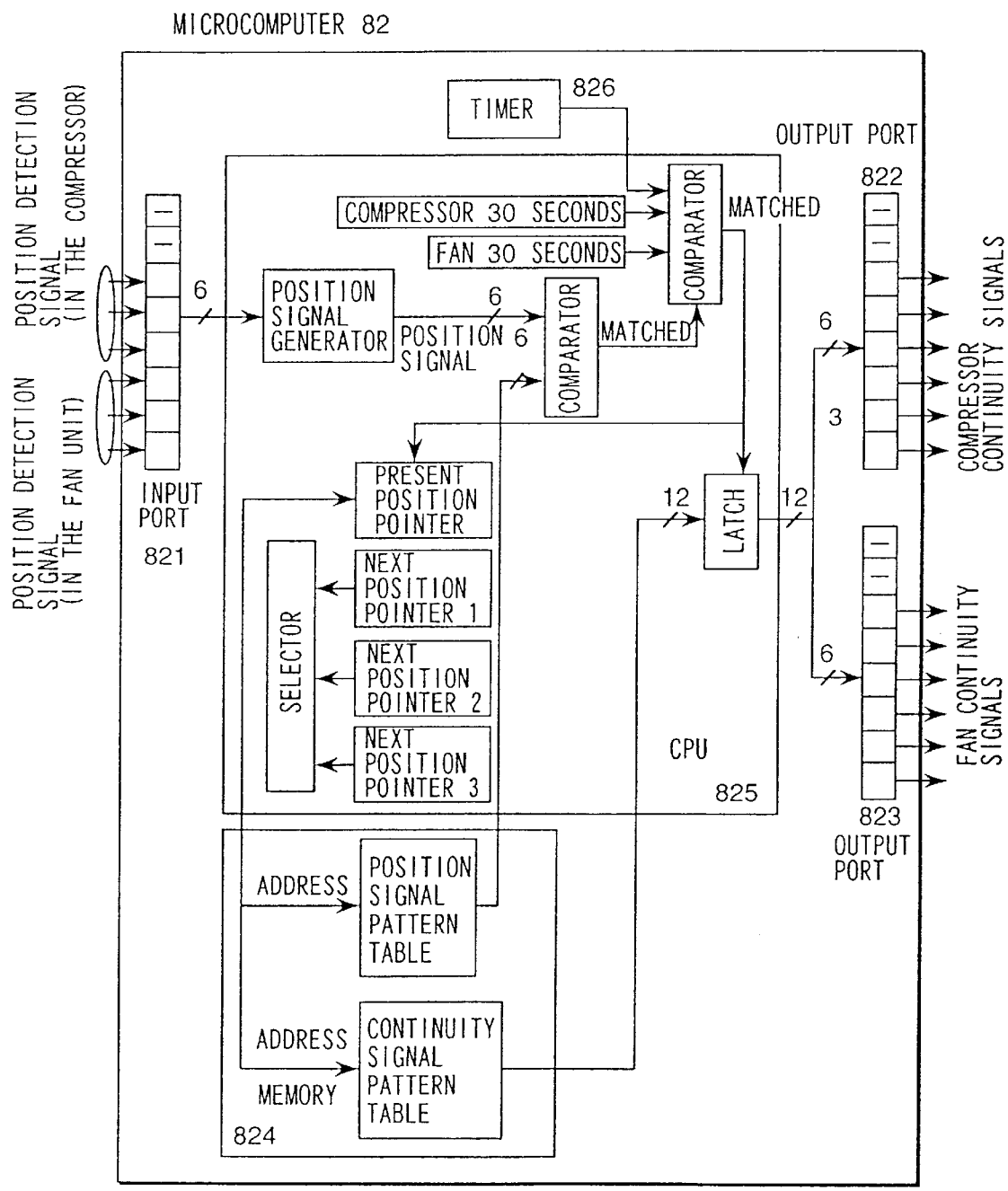
FIG. 6 is a functional block diagram of a microcomputer for detecting pole positions of brushless motors and generating Inverter Continuity (ON) signals in accordance with the present invention.

A second embodiment in accordance with the present invention is illustrated in FIG. 6. This embodiment simultaneously performs position detection processing on both the compressor and fan brushless motors (in the first embodiment of the present invention shown in FIG. 1). Particularly, FIG. 6 shows the configuration of a part of the microcomputer 82 which performs position detection processing and generation of ON signals. In this embodiment, the microcomputer 82 fetches position detection signals from the compressor brushless motor and from the fan brushless motor collectively through an input port 821, collectively processes these position-detection signals, creates a position signal for the compressor brushless motor, a position signal for the fan brushless motor, and ON signals for the inverters 4 and 6, and outputs them respectively through 8-bit output ports 822 and 823.

Figure 8:
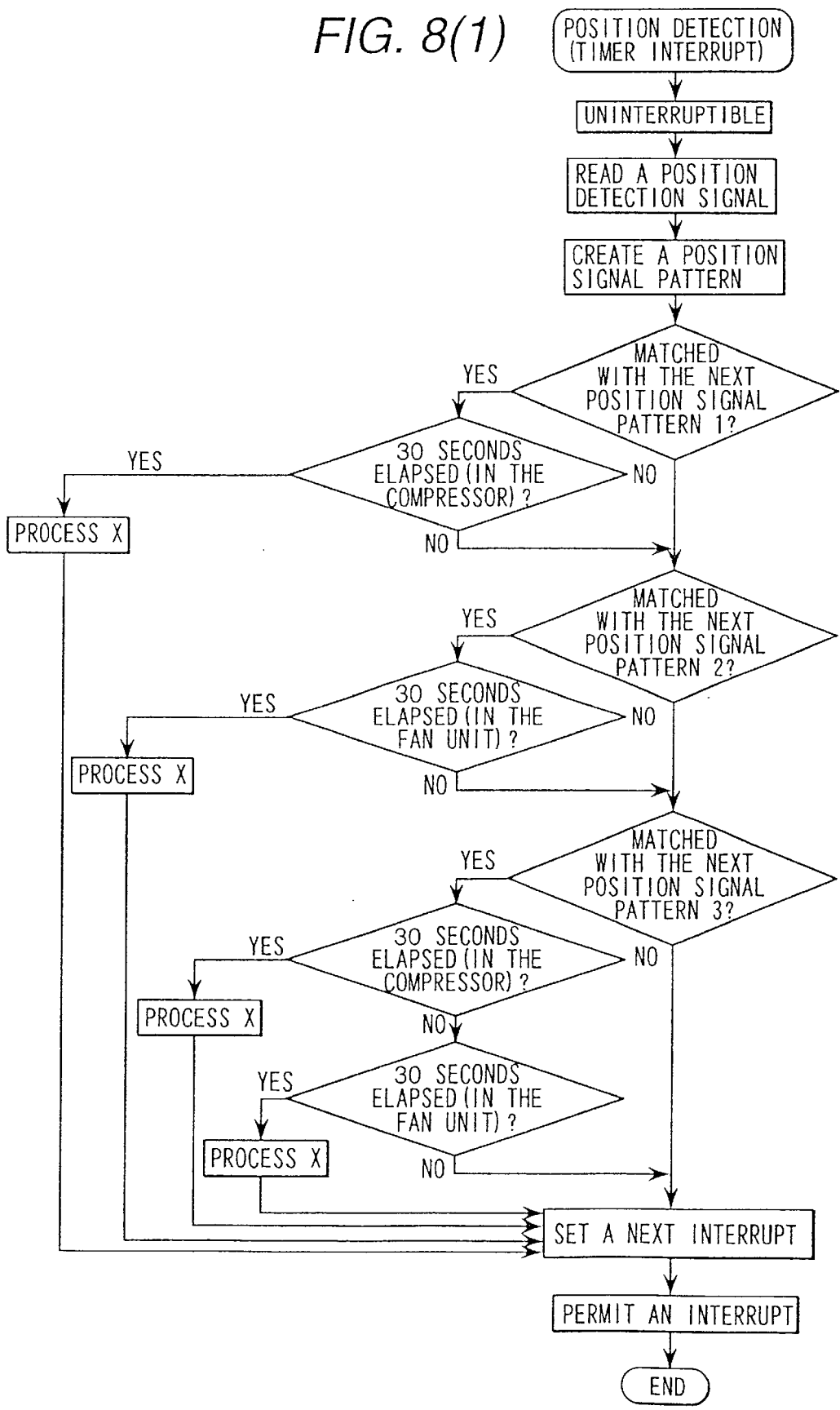
FIGS. 8(1) to 8(3) are flow charts of detecting pole positions in accordance with the present invention.
Figure 8:
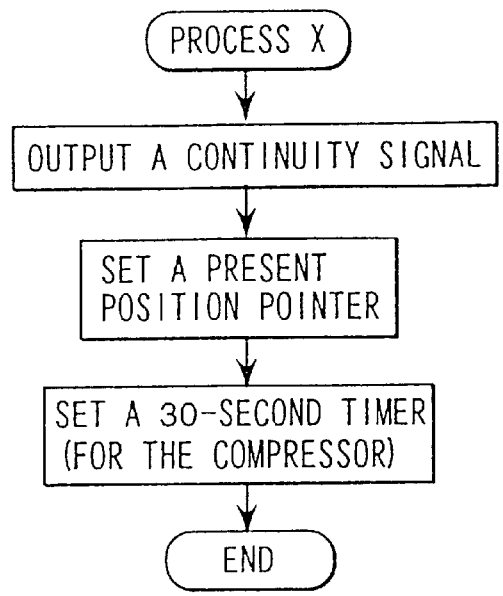
Figure 8:
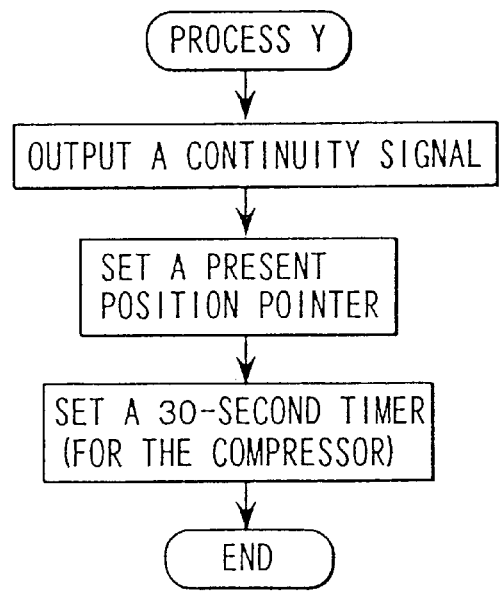

The detailed operation of this embodiment will be explained below with reference to FIG. 6, FIGS. 7(a) to 7(f), and FIGS. 8(1) to 8(3). FIGS. 7(a) and 7(b) show the configurations of a position signal pattern table and an ON signal pattern table, respectively, as stored in memory 824 shown in FIG. 6, and FIGS. 7(c) to 7(f) show configurations of the present position pointer, the next position pointer 1, the next position pointer 2, and the next position pointer 3, respectively, which are stored in the CPU chip 825. Although FIG. 6 shows that these pointers are stored in registers in the CPU chip 825, they can also be stored in memory 824. FIGS. 8(1) to 8(3) are flow charts of the processes of detecting pole positions and generating ON signals.

As shown in FIG. 6, the microcomputer 82 fetches both a 6-bit position detection signal from the compressor brushless motor and a 6-bit position detection signal from the fan brushless motor simultaneously from the input port 821. The CPU 825 removes the diode-ON periods and PWM influences from these signals by software in a publicly-known method and generates position signals for the compressor and for the fan as 6-bit data. As shown in FIG. 7(a), memory 824 of the microcomputer 82 stores a position signal pattern table comprising thirty-six 6-bit patterns which are combinations of position signal patterns P1 through P6 for the compressor brushless motor 5 by position signal patterns P1' through P6' for the fan brushless motor 7.

Similarly, as shown in FIG. 7(b), memory 824 of the microcomputer 82 stores an inverter ON signal pattern table comprising thirty-six 12-bit patterns which are combinations of ON signal patterns D1 through D6 for the compressor inverter 4 by ON signal patterns D1' through D6' for the fan inverter 6. The details of position and ON signal patterns are illustrated in FIG. 4, lines (6) and (8).

The addresses of patterns in the position signal pattern table and the ON signal pattern table are indicated by pointers, each of which consists of a combination of a position signal pattern P1 through P6 for the compressor brushless motor 5 and a position signal pattern P1' through P6' for the-fan brushless motor 7. This embodiment uses the combinations of pattern numbers for the compressor and pattern numbers for the fan as shown in FIGS. 7(a) and 7(b). The current position pointer in FIG. 7(c) is a pointer which points to a combination of the position signal pattern of the current compressor brushless motor 5 and the position signal pattern of the fan compressor brushless motor 7. The position signal pattern next to the current position signal pattern varies according to types of pattern change (change of position signal pattern for the compressor only, change of position signal pattern for the fan only, or change of position signal patterns for both the compressor and the fan). This embodiment assigns next position pointers 1 through 3 to the above pattern changes as shown in FIG. 7 (d) through FIG. 7 (f).

Referring to FIGS. 8(1) to 8(3), an explanation will be given of a procedure to detect pole positions and output inverter-ON signals using the position signal pattern table, the inverter-ON signal pattern table, and pointers which are illustrated in FIG. 7(a) to 7(f).

The microcomputer 82 generates an interrupt cyclically at a preset time interval of few microseconds by a timer which is not visible in FIG. 6 and performs operations shown in FIG. 8(1). After generating an interrupt, the microcomputer 82 inhibits generation of an interrupt and fetches both the position detection signal from the compressor brushless motor and the position detection signal from the fan brushless motor simultaneously through the input port 821. The microcomputer 82 removes the diode-ON periods and PWM influences from these signals and generates position signals for the compressor and for the fan. The microcomputer 82 compares the generated position signal patterns by the position signal pattern pointed to by the next position pointer 1. When the patterns match with each other (when only the position signal for the compressor brushless motor changes), the microcomputer 82 checks using the timer 826, whether a time period equivalent to 30 degrees has passed after the position signal pattern changes.

When the time period passes, the microcomputer 82 sends the ON signals corresponding to the patterns respectively to the output ports 822 and 823, updates the current position pattern and sets another 30 degrees for the compressor. This processing is represented by "Process X" in FIG. 8(2).

When the pattern does not match with the position signal pattern pointed to by the next position pointer 1 or when the time period equivalent to 30 degrees does not pass even if they match with each other, the microcomputer 82 compares the signal position pattern by the signal position pattern pointed to by the next position pointer 2.

When the signals match with each other (when only the position signal for the fan brushless motor changes), the microcomputer 82 checks using the timer 826, whether a time period equivalent to 30 degrees has passed after the position signal pattern changes. When the time period passes, the microcomputer 82 outputs the ON signals corresponding to the patterns, updates the current position pattern and sets another 30 degrees for the fan. This processing is represented by "Process Y" in FIG. 8(3).

When the pattern does not match with the position signal pattern pointed to by the next position pointer 2 or when the time period equivalent to 30 degrees does not pass even if they match with each other, the microcomputer 82 compared the signal position pattern by the signal position pattern pointed to by the next position pointer 3. When the signals match with each other (when both the position signals for the fan and compressor brushless motors change), the microcomputer 82 checks, using the timer 826, whether a time period equivalent to 30 degrees has passed after the position signal patterns change. When the time period passes, the microcomputer 82 performs process X. If the 30-degree time period for the compressor does not pass, the microcomputer 82 checks that the 30-degree time period for the fan has passed and performs process Y.

Although FIG. 8(1) does not contain a process to be carried out when position signal patterns for the compressor and the fan which are running at an identical RPM change simultaneously, that process need not be explained here because the number of revolutions of the compressor is usually greater than that of the fan.

In accordance with this embodiment, the load of the microcomputer 82 can be reduced because the amount of process for position detection of the second embodiment is less than that of the first embodiment. Therefore, it is possible to add a new function to the microcomputer 82 of the first embodiment or the second embodiment can use a less-expensive microcomputer than that of the first embodiment.

Figure 9:
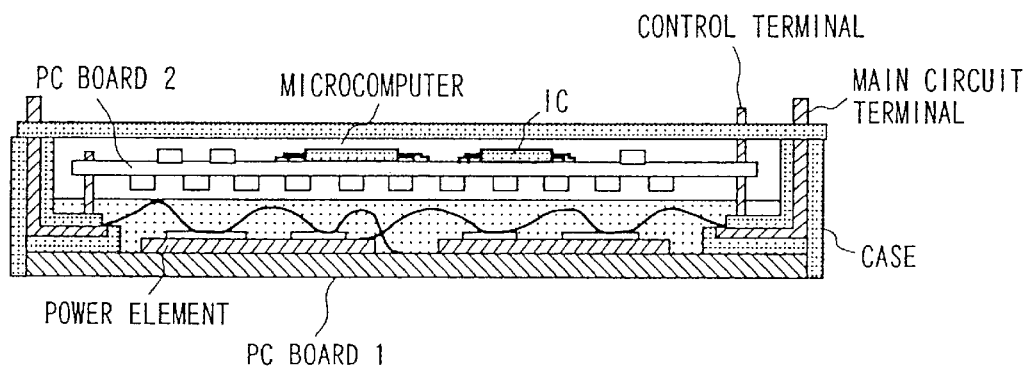
FIG. 9 is a sectional view of a module for driving brushless motors in accordance with the present invention
Figure 10:
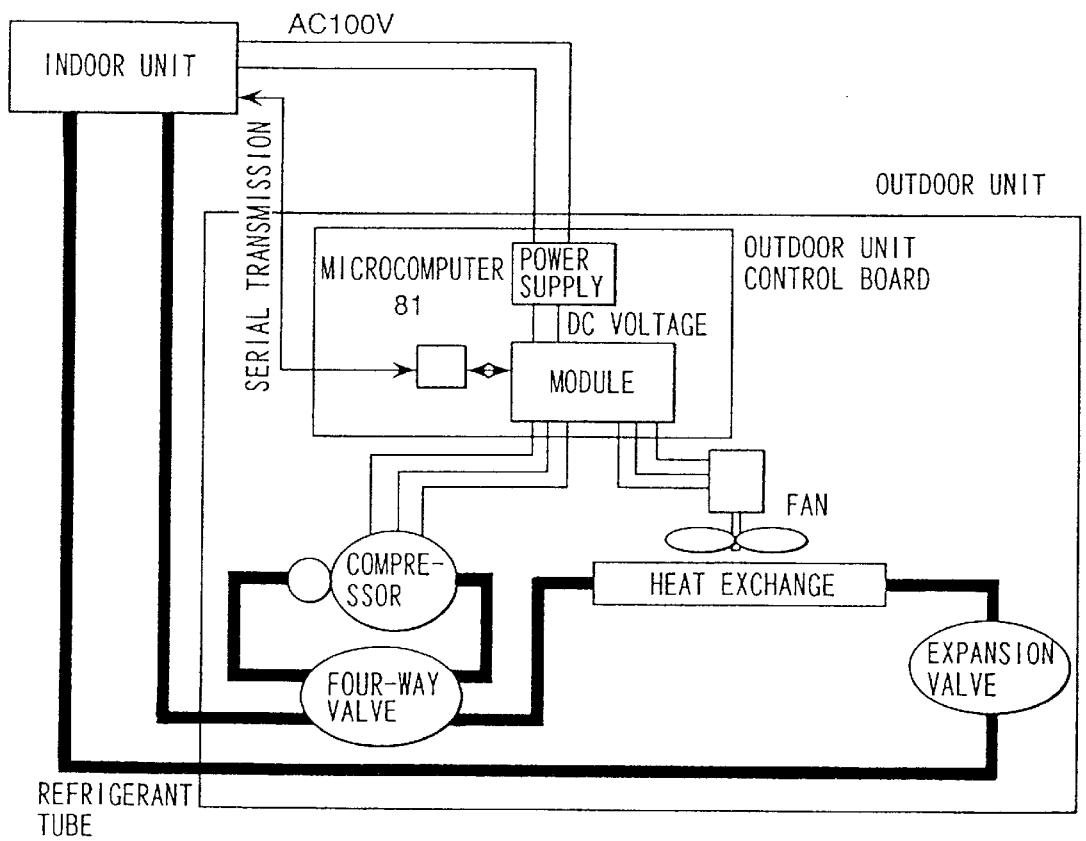
FIG. 10 is a functional block diagram of an air conditioner system in accordance with the present invention.

FIG. 9 And FIG. 10 show a third embodiment in accordance with the present invention. FIG. 9 is a sectional view of a module containing a circuit enclosed by a bold line in FIG. 1. The module of this embodiment comprises a printed circuit board 1 having inverters on it and a printed circuit board 2 having a microcomputer on it. The printed circuit board 2 is mounted on the printed circuit board 1 and a set of these printed circuit boards is housed in a plastic casing. The printed circuit board 1 has parts generating great heat such as power elements for inverters 4 and 6 and high-voltage components such as driving circuits and voltage detecting circuits. The printed circuit board 2 has low-voltage and low-power components such as a microcomputer chip and its peripheral parts.

FIG. 10 shows an air conditioner using this module. In accordance with this embodiment, the outdoor unit of the air conditioner can be made highly compact and have power wires shortened greatly, which reduces electromagnetic noises from the wiring and makes the outdoor unit more compact.

Although an outdoor unit of an air conditioner is used in the above preferred embodiments, it is to be understood that the invention is not intended to be limited to the specific embodiments. The present invention can also be applied to equipment which drives a plurality of brushless motors such as refrigerators and the like.

This invention separates the function of controlling motors and inverters from the function of controlling the whole outdoor unit in an air conditioner system and makes two different microcomputers perform these functions separately. This can simplify software for the microcomputer which controls the outdoor unit of the air conditioner and can facilitate modification of cooling cycles and sequences just by changing the content of software for the system-controlling microcomputer only. Consequently, this can greatly reduce the steps required to change the functions of the air conditioner.

Further, in accordance with this invention, the microcomputer for controlling the motors and inverters can simultaneously perform processing to detect pole positions of two brushless motors. This can reduce the load of the microcomputer.

Further, in accordance with the present invention, the inverters and control circuits in the outdoor unit of the air conditioner can be highly integrated. This makes the outdoor unit of the air conditioner more compact and less noisy.

What is claimed is:

1. An air conditioner whose outdoor unit comprises a brushless motor for driving a compressor, a brushless motor for driving a fan which feeds air to a heat exchanger, inverters for driving the brushless motors individually at various speeds, and means for detecting pole positions of each brushless motor; wherein the conditioner further comprises:

a first microcomputer responsive to pole position detection signals and number of revolutions commands for outputting inverter control signals to drive said brushless motors, respectively, at various speeds, and a second microcomputer for controlling the outdoor unit of the air conditioner including said first microcomputer.

2. An air conditioner in accordance with claim 1, wherein: said first microcomputer for driving the brushless motors receives number of revolutions commands and Pole Position Detection signals from said second microcomputer for controlling said outdoor unit, drives said brushless motors, respectively, at various speeds in response to said detection signals and sends information of operation of each brushless motor from said first microcomputer for driving the brushless motors to said second microcomputer for controlling said outdoor unit.

3. An air conditioner in accordance with claim 2, wherein:
   said first microcomputer for driving the brushless motors reads pole position detection signals from said brushless motors through a single input port, estimates the pole position of each of said brushless motors from said detection signals, and outputs ON signals to each of said brushless motors according to estimated signals.

4. A brushless motor controlling unit for an outdoor unit of an air conditioner which drives a plurality of brushless motors independently using inverters, said controlling unit comprising:

a first microcomputer for driving brushless motors;

a second microcomputer for controlling the outdoor unit of the air conditioner including said first microcomputer;

a position signal pattern table containing pattern information consisting of combinations of pole position signals of each brushless motor;

an ON signal pattern table containing information consisting of combinations of inverter ON signals;

a pointer which points to a combination of current position signal patterns of said brushless motors; and three pointers each of which points to a combination of next possible position signal patterns;

wherein a preset time period after a state occurs in which a detected position signal pattern combination matches with one of said three pointers, an inverter-ON signal pattern corresponding to the matched pointer is output as an ON signal for said respective inverters.

5. An air conditioner controlling unit in accordance with claim 3, wherein said first microcomputer for driving brushless motors comprises:

a position signal pattern table containing pattern information consisting of combinations of pole position signals of each brushless motor;

an ON signal pattern table containing information consisting of combinations of inverter ON signals;

a pointer which points to a combination of current position signal patterns of said brushless motors, and three pointers each of which points to a combination of next possible position signal patterns;

wherein a preset time period after a state occurs in which a detected position signal pattern combination matches with one of said three pointers, an inverter-ON signal pattern corresponding to the matched pointer is output as an ON signal for said respective inverters.

6. A brushless motor controlling unit for an outdoor unit of an air conditioner comprising: inverters; means for driving said inverters; means for generating pole position detecting signals of the brushless motors from output voltages of said inverters; and a first microcomputer for driving brushless motors;

a second microcomputer for controlling the outdoor unit of the air conditioner including said first microcomputer;

said first microcomputer responsive to said pole position detecting signals for outputting inverter-ON signals;

wherein a printed circuit board having said inverters on it and a printed circuit board having said first microcomputer on it are housed in a single module.

7. A semiconductor module for controlling brushless motor of an air conditioner comprises:
   inverters for driving a plurality of brushless motors independently; means for driving said inverters; means for generating pole position detecting signals of the brushless motors from output voltages of said inverters; and a microcomputer for driving said brushless motors responsive to said pole position detecting signals for outputting inverter-ON signals; wherein said semiconductor module drives a brushless motor for the compressor and a brushless motor for a fan in the outdoor unit.

* * * * *